US008708122B2

(12) United States Patent  
Einboeck

(10) Patent No.: US 8,708,122 B2
(45) Date of Patent: Apr. 29, 2014

(54) CLUTCH ACTUATION SYSTEM

(75) Inventor: Fritz Einboeck, Gunskirchen (AT)

(73) Assignee: BRP-Powertrain GmbH & Co. KG, Gunskirchen (AT)

( * ) Notice: Subject to any disclaimer, the term of this patent is extended or adjusted under 35 U.S.C. 154(b) by 0 days.

(21) Appl. No.: 13/480,320

(22) Filed: May 24, 2012

(65) Prior Publication Data

US 2012/0228078 A1   Sep. 13, 2012

Related U.S. Application Data

(63) Continuation of application No. 11/931,788, filed on Oct. 31, 2007, now abandoned.

(51) Int. Cl.
*F16D 21/00* (2006.01)
(52) U.S. Cl.
USPC ..... 192/83; 192/85.37; 192/103 R; 192/93 A; 192/70.23
(58) Field of Classification Search
USPC ............. 192/83, 83.37, 103 R, 103 A, 105 R, 192/105 B, 85.37, 93 A, 70.23
See application file for complete search history.

(56) References Cited

U.S. PATENT DOCUMENTS

| | | | |
|---|---|---|---|
| 5,617,938 A | 4/1997 | Tsukada et al. | |
| 5,860,892 A | 1/1999 | Korenjak et al. | |
| 6,533,056 B1 * | 3/2003 | Maimone | 180/230 |
| 6,851,885 B2 | 2/2005 | Inui et al. | |
| 7,044,283 B2 | 5/2006 | Gokan et al. | |
| 7,234,579 B2 | 6/2007 | Grethel et al. | |
| 7,235,035 B2 | 6/2007 | Korenjak et al. | |
| 2007/0144862 A1 | 6/2007 | Koyama et al. | |

FOREIGN PATENT DOCUMENTS

| | | |
|---|---|---|
| GB | 965250 | 7/1964 |
| JP | 60184721 | 9/1985 |
| WO | 2004001252 A1 | 12/2003 |

OTHER PUBLICATIONS

Partial European Search Report of Patent Application EP 08168128; Feb. 2, 2009; Munich; Foulger, Matthew.

* cited by examiner

*Primary Examiner* — David D Le
*Assistant Examiner* — Ryan Dodd
(74) *Attorney, Agent, or Firm* — BCF LLP

(57) ABSTRACT

A multiple-disk clutch has inner and outer clutch members, and a plurality of driving and driven friction disks. The driven and driving friction disks are arranged alternately. A first axially movable pressure member is biased to urge the driving and driven friction disks together in a compression direction. A first actuation system is connected to the first pressure member. The first actuation system is adapted release the compression force exerted by the first pressure member on the driving and driven friction disks. A second actuation system includes a second pressure member and is axially movable to compress the driving and driven friction disks together. The driving and driven friction disks are disposed between the first and second pressure members. The second actuation system is a centrifugal actuation system. The first actuation system is connected to and is axially movable with the second pressure member.

11 Claims, 7 Drawing Sheets

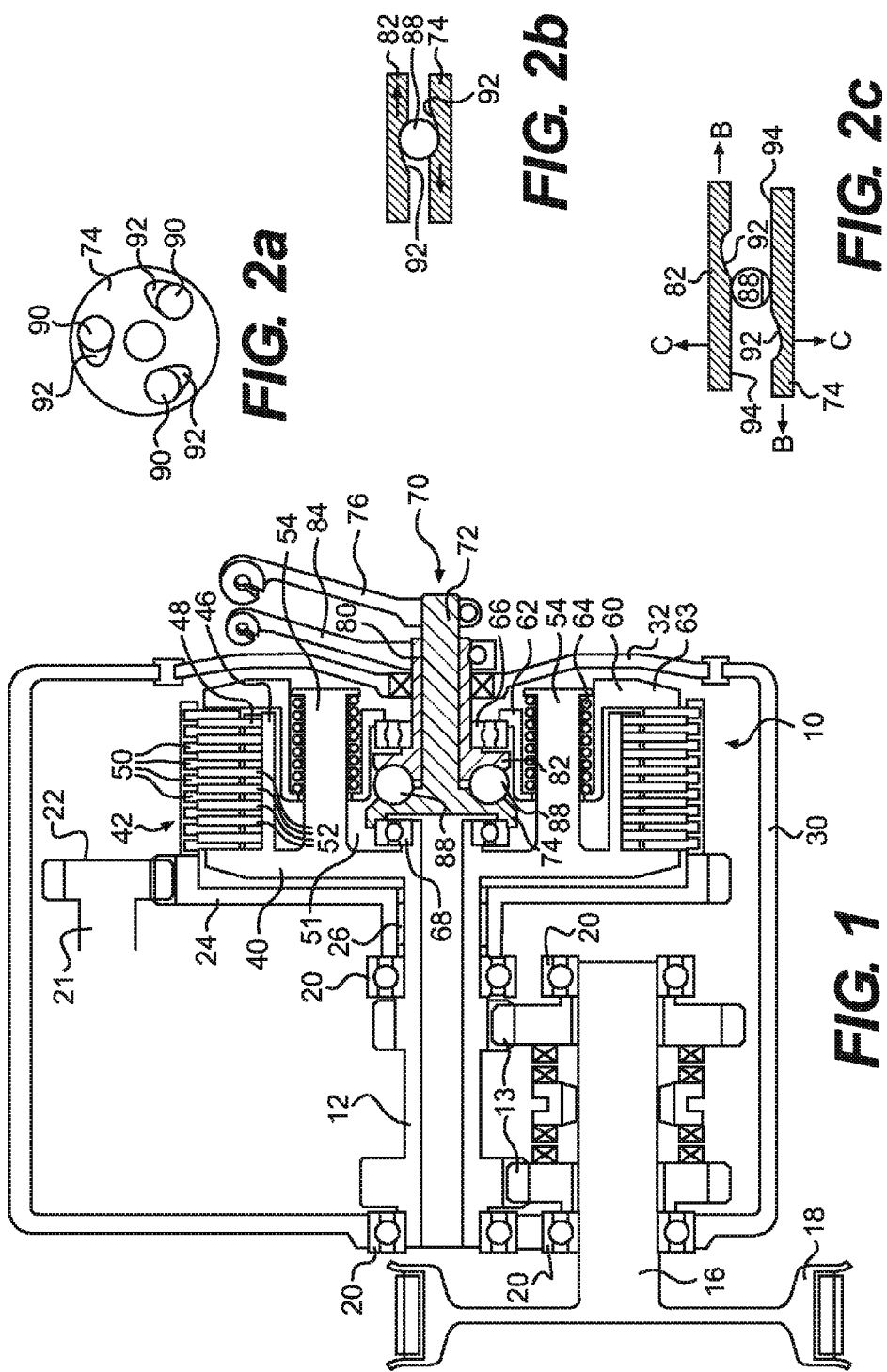

CLUTCH ACTUATION SYSTEM

CROSS-REFERENCE

The present application is a continuation of U.S. patent application Ser. No. 11/931,788, filed Oct. 31, 2007, the entirety of which is incorporated herein by reference.

FIELD OF THE INVENTION

The present invention relates generally to a multiple-disk clutch and in particular to an actuation system for a multiple-disk clutch used in the power train of a motor vehicle.

BACKGROUND

Multiple-disk clutches typically include driving friction disks and driven friction disks arranged alternately, an outer clutch member, an inner clutch member and a pressure mechanism. The pressure mechanism applies pressure to the superposed driving and driven clutch disks to transmit power from the outer clutch member to the inner clutch member through friction between the driving and the driven clutch disks. When the pressure applied to the driving and the driven clutch disks by the pressure mechanism is removed, the driving and the driven clutch disks are spaced apart to stop power transmission.

The pressure mechanism of a multiple-disk clutch is generally positioned on the outer portion of the multiple-disk clutch for easy access and connection. An actuating system connected to the pressure mechanism for removing the pressure exerted by the pressure mechanism on the friction disks is also generally positioned on the outer portion of the multiple-disk clutch for easy access and connection. This arrangement of pressure mechanism and actuating system increases the width of the clutch assembly, making the clutch and transmission assembly bulkier.

Thus, there is a need for a multiple-disk clutch that is less bulky than conventional multiple-disk clutch assembly.

SUMMARY

It is an object of the present invention to ameliorate at least some of the inconveniences present in the prior art.

In one aspect, a multiple-disk clutch for transmitting power from a crankshaft of an engine to a transmission input shaft has an inner clutch member adapted to be connected to the transmission input shaft, an outer clutch member disposed around at least a portion of the inner clutch member and adapted to be connected to the crankshaft, a plurality of driving friction disks connected to and extending from the outer clutch member toward the inner clutch member, and a plurality of driven friction disks connected to and extending from the inner clutch member toward the outer clutch member. The driven friction disks and the driving friction disks are arranged alternately. A first pressure member is axially movable to compress the driving and the driven friction disks together and to disengage the driven friction disks from the driving friction disks. The first pressure member is biased to urge the driving and driven friction disks together in a compression direction. A first actuation system is connected to the first pressure member. The first actuation system is adapted to overcome the biasing force urging the driving and driven friction disks together in the compression direction and release the compression force exerted by the first pressure member on the driving and the driven friction disks such that the friction disks are spaced apart and power transmission through the multiple-disk clutch is interrupted. A second actuation system includes a second pressure member. The second pressure member is axially movable to compress the driving and the driven friction disks together. The driving and driven friction disks are disposed between the first and second pressure members. The second actuation system is a centrifugal actuation system adapted to apply pressure to the driving and driven friction disks as a function of a speed of rotation of the multiple-disk clutch. The first actuation system is connected to and is axially movable with the second pressure member.

In an additional aspect, the first actuation system includes at least two ball bearings sandwiched between a first actuator plate and a second actuator plate. Each actuator plate includes cavities for receiving the at least two ball bearings. Each cavity includes a ramping area. The actuator plates are adapted to rotate in opposite direction such that the ball bearings are forced up the ramping areas thereby pushing the actuator plates apart and forcing the pressure member to release the compression force on the driving and the driven friction disks.

In a further aspect, a first lever shaft is connected at one end thereof to the first actuator plate. The first lever shaft has a first lever connected at the other end thereof. A second lever shaft is connected at one end thereof to the second actuator plate. The second lever shaft has a second lever connected at the other end thereof. Movement of at least one of the first and second levers causes rotation of the first and second actuator plates.

In an additional aspect, the first and second levers are connected together via a cable linked to one of a clutch handle and pedal for interaction with an operator.

In a further aspect, the first actuation system includes: a hydraulic piston/cylinder assembly connected to the first pressure member, and a hydraulic line connected to and in fluid communication with the piston/cylinder assembly. In operation, hydraulic fluid under pressure expands the piston/cylinder assembly which in turn pushes the first pressure member to release the compression force exerted by the first pressure member on the driving and the driven friction disks.

In an additional aspect, the hydraulic line extends through the first pressure member.

In a further aspect, at least one spring biases the first pressure member to urge the driving and driven friction disks together in the compression direction.

In an additional aspect, the at least one spring is disposed between the first pressure member and the inner clutch member.

In a further aspect, a distance by which the first pressure member has to be moved axially by the first actuation system to disengage the driven friction disks from the driving friction disks is the same regardless of a position of the second pressure member.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where:

FIG. 1 is a cross-sectional view of a clutch and clutch actuation system in accordance with a first embodiment of the invention;

FIG. 2a is a top plan view of one component of the clutch actuation system shown in FIG. 1;

FIG. 2b is a cross-sectional view of the component of the clutch actuation system shown in FIG. 2a in a first position;

FIG. 2c is a cross-sectional view of the component of the clutch actuation system shown in FIG. 2a in a second position;

DETAILED DESCRIPTION

Figure 3:
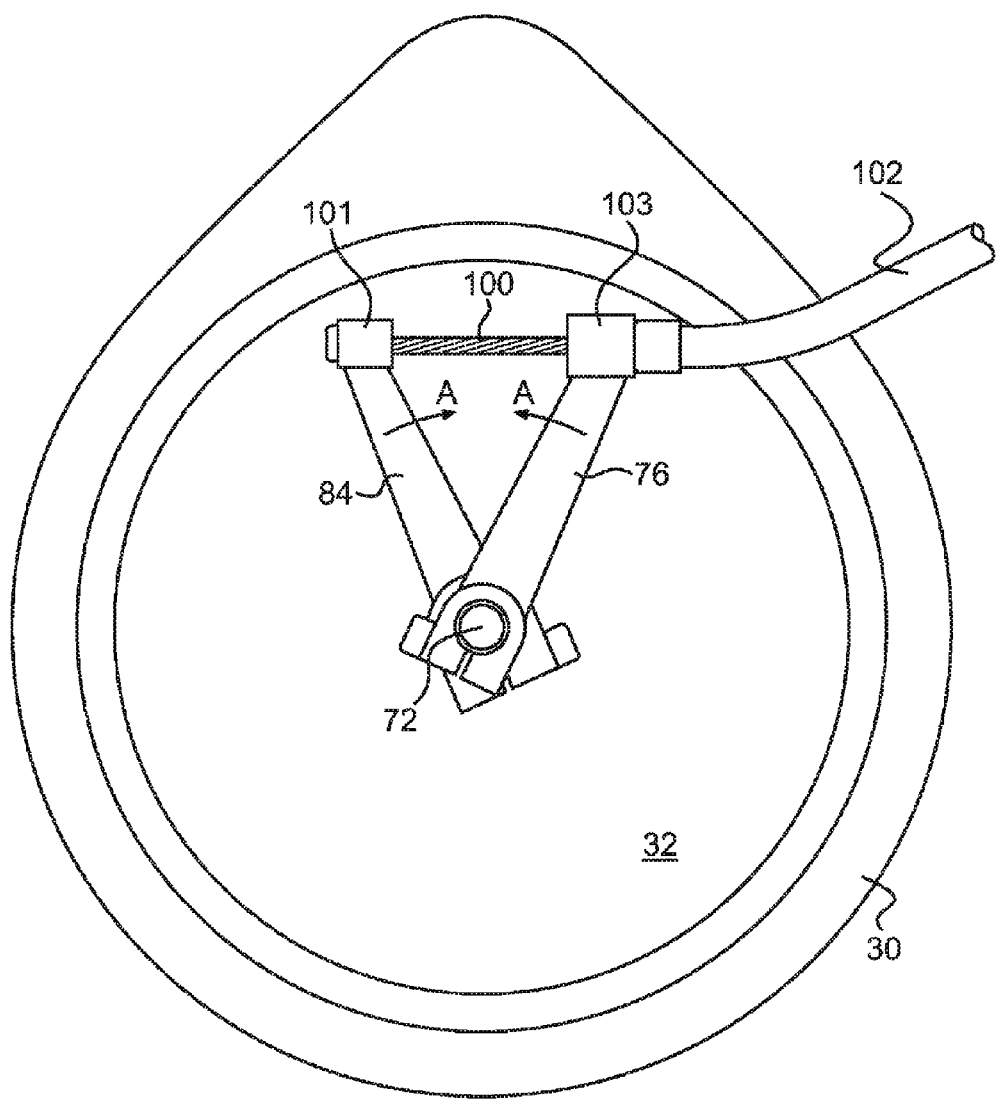
FIG. 3 is a side elevation view of an outer casing of the clutch and clutch actuation system shown in FIG. 1 showing the portions of the clutch actuation system extending outside the outer casing.

FIG. 1 is a longitudinal sectional view of a first embodiment of a multiple-disk clutch 10 in accordance with the present invention and parts associated with the multiple-disk clutch 10. The multiple-disk clutch 10 is mounted onto one end of a transmission input shaft 12 within a transmission casing 30. The transmission input shaft 12 extends parallel to the transmission output shaft 16 which is connected to a belt pulley or chain sprocket 18 transmitting power to the wheel(s) of a vehicle (not shown). Note that the transmission output shaft 16 can also be connected to a differential and drive shaft mechanism as is well known in the art. The transmission input shaft 12 and output shaft 16 are supported for rotation by a series of bearings 20.

The crankshaft 21 of an engine (not shown), is connected to a drive gear 22 which is engaged with a driven gear 24. The driven gear 24 is coaxial with the transmission input shaft 12 and is supported for rotation by a needle bearing 26 on the transmission input shaft 12.

The multiple-disk clutch 10 as well as the transmission input and output shafts 12 and 16 are housed within the transmission casing 30. A removable side cover 32 allows access to the multiple-disk clutch 10 for servicing and general maintenance.

The multiple-disk clutch 10 includes an inner clutch member 40 disposed on the inner side of the multiple-disk clutch 10 and connected to the transmission input shaft 12, and an outer clutch member 42 disposed on the outer circumference of the multiple-disk clutch 10 and connected to the driven gear 24. An inner clutch element 46 extends from the inner clutch member 40. A series of driving friction disks 50 are connected to and extend inwardly from the outer clutch member 42. A series of driven friction disks 52 are connected to and extend outwardly from the inner clutch element 46. It is understood that the driving friction disks 50 could extend outwardly and the driven friction disks 52 could extend inwardly from the inner and outer clutch members 40 and 42 depending on the arrangement of the clutch members 40 and 42 relative to the driven gear 24 and the transmission input shaft 12. The driven friction disks 52 and the driving friction disks 50 are arranged axially alternately. The driving friction disks 50 are axially movable relative to the outer clutch member 42, and the driven friction disks 52 are axially movable relative to the inner clutch element 46.

A pressure member 60 is mounted via coil springs 64 onto spring holders 54 which extend from the inner clutch member 40. As shown in FIG. 1, the body of the pressure member 60 has a cross section having a generally U-shape, the bottom of the "U" being moveably connected to the spring holders 54 via coil springs 64. A pressure plate 63 that circumscribes the alternately arranged driving and driven friction disks 50 and 52, extends from the outer leg of the U-shape body of the pressure member 60. A release plate 62 extends from the inner leg of the U-shape body of the pressure member 60 and abuts against bearing 66. The pressure plate 63 applies pressure to the superposed driving and driven friction disks 50 and 52 to transmit power from the outer clutch member 42 to the inner clutch member 40 by the agency of friction between the driving and the driven friction disks 50 and 52. When the pressure applied to the driving and the driven friction disks 50 and 52 by the pressure plate 63 is released, the driving and the driven friction disks 50 and 52 are spaced apart to stop power transmission.

The central portion of the multiple-disk clutch 10 includes an actuation system 70 adapted for moving the pressure member 60 and releasing the pressure applied to the driving and the driven friction disks 50 and 52 by the pressure plate 63. The actuation system 70 includes a central lever shaft 72 having an actuator plate 74 at one end thereof and a first lever 76 connected at the other end thereof, a peripheral lever shaft 80, hollowed and coaxial with the central lever shaft 72, the peripheral lever shaft 80 having an actuator plate 82 at one end thereof and a second lever 84 at the other end thereof, and a series of ball bearings 88 sandwiched between the actuator plates 74 and 82. Note that the ball bearings 88 could be replaced by roller bearings having a conical shape.

In operation, power from the engine is delivered from the engine crankshaft 21 to the driven gear 24 via the meshing of the drive gear 22 and driven gear 24. The rotation of the driven gear 24 is transferred to the outer clutch member 42 connected to the driven gear 24. The power is transferred from the outer clutch member 42 to the inner clutch element 46 via the friction disks 50 and 52. The inner clutch member 46 being connected to transmission input shaft 12 transfers power directly to the input shaft 12 which in turn transfers power to the transmission output shaft 16 through the gear meshing 13. The transmission output shaft 16 is connected to the belt pulley 18 which transmits power to the wheel(s) of a vehicle (not shown).

With reference to FIGS. 2a, 2b and 2c, the actuator plates 74 and 82 each include cavities 90 for receiving the bearings 88. As illustrated, each cavity 90 includes a ramping area 92. With reference to FIG. 3, which is a front view of the casing 30 of the multiple-disk clutch 10, the first and second levers 76 and 84 are mounted onto the central lever shaft 72 and the peripheral lever shaft 80 respectively and are offset relative to one another. A sliding cable 100 is connected to the end 101 of the second lever 84 while a cable sleeve 102 is connected to the end 103 of the first lever 76. The sliding cable 100 and the cable sleeve 102 are both connected at their other ends to a clutch handle or pedal (not shown) operated by the driver such that when the driver of the vehicle actuates the clutch handle or pedal, the sliding cable 100 pulls the first lever 76 and the second lever 84 towards each other as illustrated by arrows A to disengage the driving and driven friction disks 50 and 52 of the multiple-disk clutch 10.

In operation, when the first lever 76 and the second lever 84 are actuated by the operator of the vehicle as illustrated by arrows A in FIG. 3, the actuator plates 74 and 82 are rotated in opposite direction as illustrated by arrows B in FIG. 2c. With the opposite rotation of actuator plates 74 and 82, the ball bearings 88 are forced up the ramping areas 92 onto flat surfaces 94 and in so doing, push the actuator plates 74 and 82 apart as illustrated by arrows C in FIG. 2c, thereby increasing the distance between actuator plates 74 and 82.

Referring back to FIG. 1, the actuator plate 74 is supported by bearing 68 which is supported by the end of the transmission input shaft 12, while the actuator plate 82 is abutting bearing 66 which is supporting the release plate 62 as previously mentioned. Therefore, in operation, when the first lever 76 and the second lever 84 are actuated by the operator of the vehicle as illustrated by arrows A in FIG. 3; the ball bearings 88 effectively push the release plate 62 via bearing 66, overcome the force of the coil springs 64 and release the pressure exerted by the pressure plate 63 onto the driving and the driven friction disks 50 and 52 such that the friction disks 50 and 52 are spaced apart and the power transmission through the multiple-disk clutch 10 is interrupted. It is understood that when the first and second levers 76 and 84 are not actuated, the coil springs 64 maintain the pressure plate 63 firmly against the driving and the driven friction disks 50 and 52, allowing power transmission through the multiple-disk clutch 10.

The portion of the actuation system 70 exerting the forces onto the release plate 62 in order to disengage the friction disks 50 and 52 is located within the multiple-disk clutch 10 and more precisely, within a central cavity 51 formed by the plurality of alternating driven and driving friction disks 50 and 52, such that the moving parts are protected against the environment and the overall size of the multiple-disk clutch 10 is reduced.

Furthermore, because the actuation system 70 of the multiple-disk clutch 10 is supported by bearings 66 and 68, and therefore by inner clutch member 40 and by the transmission input shaft 12 and by the pressure plate 63, the actuation system 70 is stiffer than prior art systems which are typically supported by the side cover of the clutch. The added stiffness of supporting the actuation system 70 on the internal components of the multiple-disk clutch 10 enables the design of an actuation system 70 that requires less travel to disengage the friction disks 50 and 52 as the bending of the side cover of the clutch is removed from the equation. Thus, for a given length of the first and second levers 76 and 84 (FIG. 3), the disengagement of the friction disks 50 and 52 requires less force to be applied by the driver when the driver actuates the clutch handle or pedal. This is particularly advantageous for clutch handle since the available force of a human hand is limited. In prior art systems, the clutch actuation system is supported either by the side cover of the transmission or by the housing of the transmission resulting in an elastic deformation that increases the length of travel requires to disengage the friction disks. Mounting the actuation system 70 on the inner clutch member 40 eliminates the elastic deformation of prior art systems. The actuation system 70 could also be mounted on the outer clutch member 42 with similar results.

Figure 4:
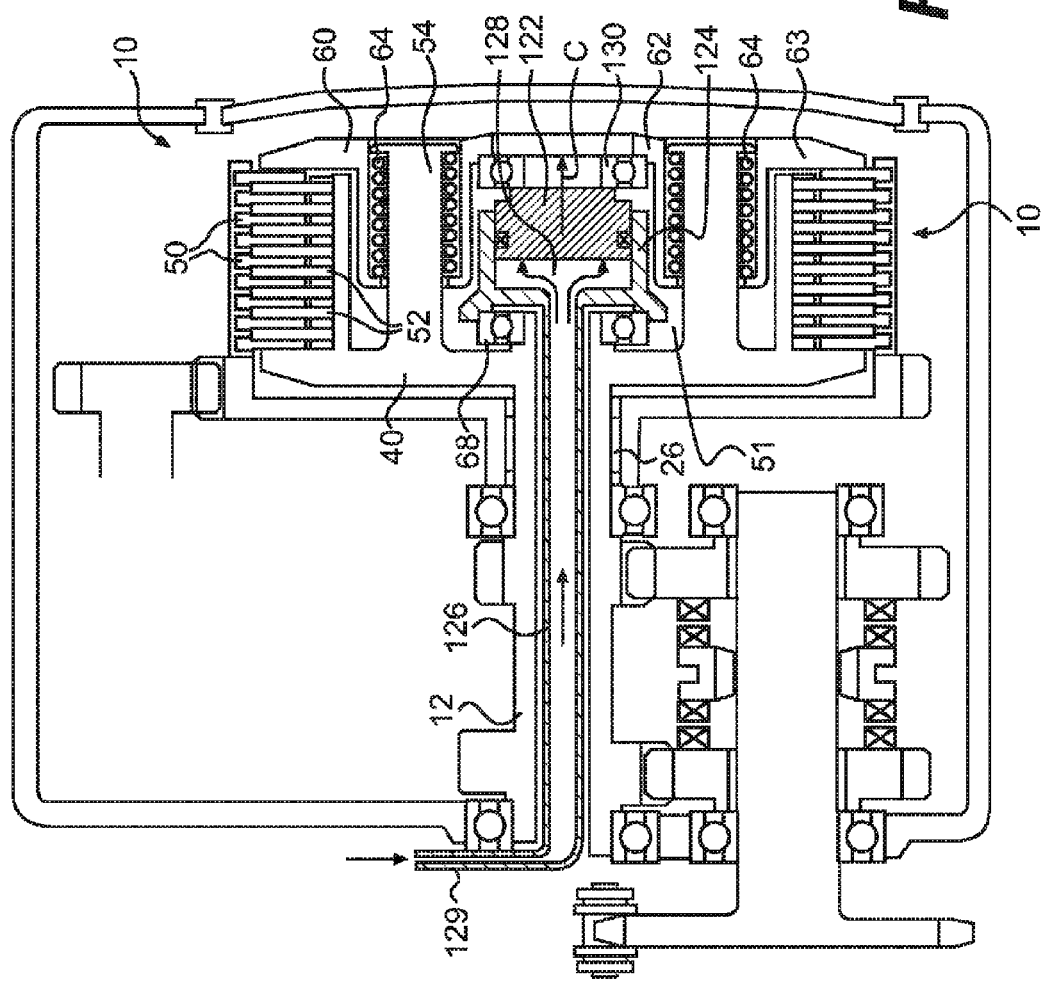
FIG. 4 is a cross-sectional view of a clutch and clutch actuation system in accordance with a second embodiment of the invention.

Referring now to FIG. 4, there is shown a second embodiment of the invention, wherein the multiple-disk clutch 10 is actuated by a hydraulic actuating system. The pressure member 60 is similarly mounted via coil springs 64 onto spring holders 54 which extend from the inner clutch member 40 as described for the first embodiment. The release plate 62 of the pressure member 60 abuts against a bearing 130 which is mounted onto the piston 122 of a piston/cylinder assembly 122/124 located within the multiple-disk clutch 10. The cylinder 124 is mounted directly onto bearing 68 supporting the inner clutch member 40 and the end of the transmission input shaft 12. A hydraulic line 126 extends through the length of the transmission input shaft 12 and is connected at one end to the piston/cylinder assembly 122/124 and is in fluid communication with the chamber 128 of the piston/cylinder assembly 122/124. The other end 129 of the hydraulic line 126 is connected to a clutch handle or pedal (not shown) of the vehicle typically through a second piston/cylinder assembly near the clutch handle or pedal as is well known in the art.

In operation, to disengage the pressure plate 63 from the friction disks 50 and 52, the operator of the vehicle actuates the clutch handle or pedal, which pushes hydraulic fluid through the hydraulic line 126 into the chamber 128 of the piston/cylinder assembly 122/124. The piston 122 is pushed outwardly by the hydraulic pressure as indicated by arrow C, which in turn pushes the release plate 62 that overcomes the force of the coil springs 64, thereby releasing the pressure exerted onto the friction disks 50 and 52 by the pressure plate 63, such that the friction disks 50 and 52 are spaced apart and the power transmission through the multiple-disk clutch 10 is interrupted.

The hydraulic actuating system is positioned within the multiple-disk clutch 10 and more precisely, within a central cavity 51 formed by the plurality of alternating driven and driving friction disks 50 and 52, such that the moving parts of the piston/cylinder assembly 122/124 are protected against the environment and the overall size of the multiple-disk clutch 10 is reduced.

The piston/cylinder assembly 122/124 of the multiple-disk clutch 10 is supported by bearing 68, and therefore by inner clutch member 40 and by the transmission input shaft 12. The piston/cylinder assembly 122/124 is more rigid than prior art system which are typically supported by the side cover of the transmission housing. The added stiffness of supporting the piston/cylinder assembly 122/124 on the internal components of the multiple-disk clutch 10 requires less travel to disengage the friction disks 50 and 52 as the bending of the side cover of the clutch is removed from the equation. Thus, the disengagement of the friction disks 50 and 52 requires less hydraulic fluid to displace the piston 122. In prior art systems, the hydraulic clutch actuation system is typically supported either by the side cover of the transmission or by the housing of the transmission resulting in an elastic deformation that increases the length of travel of the piston required to disengage the friction disks. Mounting the piston/cylinder assembly 122/124 on the inner clutch member 40 eliminates the elastic deformation of prior art systems. The piston/cylinder assembly 122/124 could also be mounted on the outer clutch member 42 with similar results.

Figure 5:
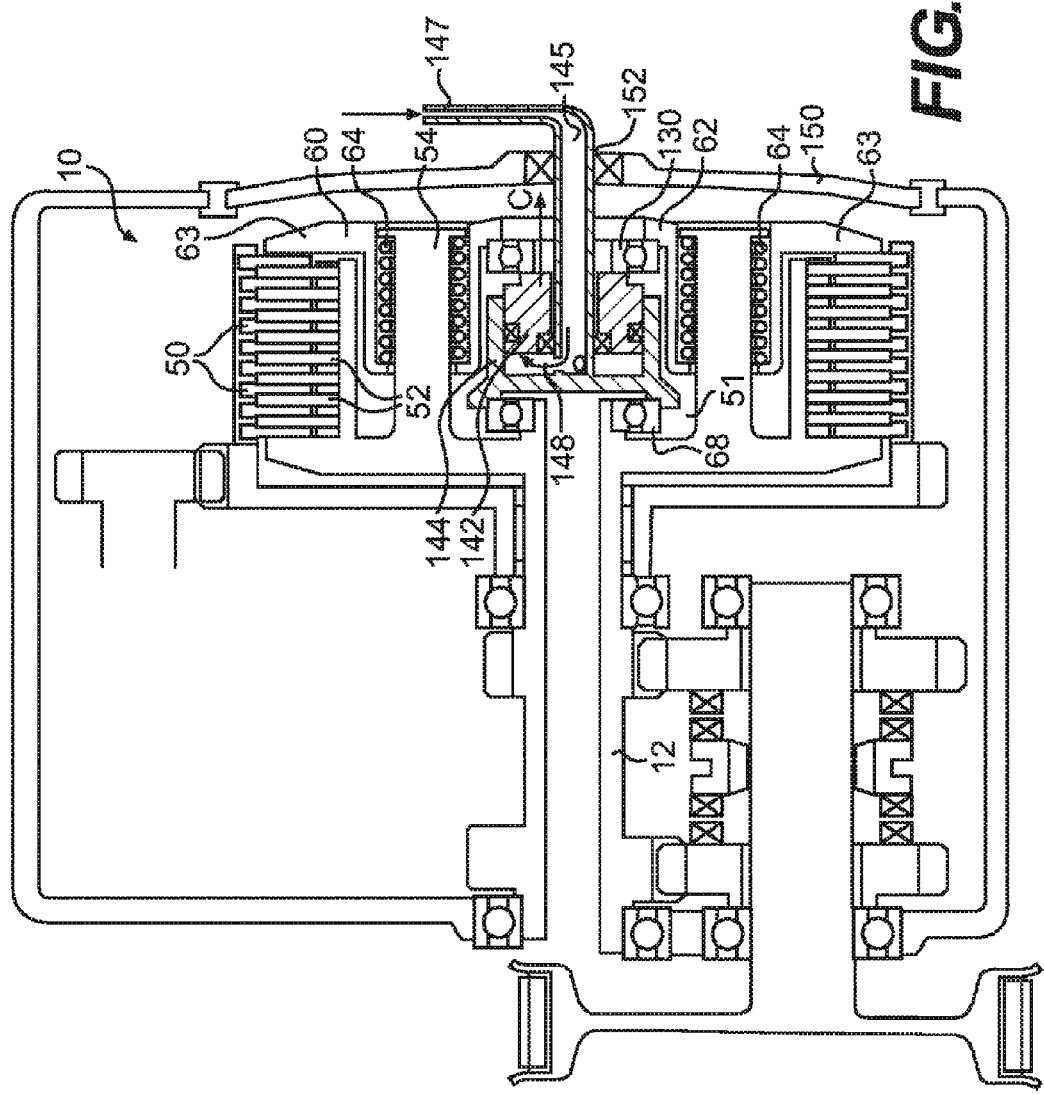
FIG. 5 is a cross-sectional view of a clutch and clutch actuation system in accordance with a third embodiment of the invention.

Referring now to FIG. 5, there is shown a third embodiment of the invention, wherein the multiple-disk clutch 10 is also actuated by a hydraulic actuating system similar to the hydraulic system shown in FIG. 4. The pressure member 60 is similarly mounted via coil springs 64 onto spring holders 54 which extend from the inner clutch member 40 as described for the first and second embodiments. The release plate 62 of the pressure member 60 abuts against a bearing 130 which is mounted onto the piston 142 of a piston/cylinder assembly 142/144 located within the multiple-disk clutch 10. The cylinder 144 is mounted directly onto bearing 68 supporting the inner clutch member 40 and the end of the transmission input shaft 12. A hydraulic line 145 extends through an aperture 152 of the side cover 150, through the bearing 130 and through the piston 142, and is connected at one end to the chamber 148 and is in fluid communication with chamber 148 of the piston/cylinder assembly 142/144. The other end 147 of the hydraulic line 145 is connected to a clutch handle or pedal (not shown) of the vehicle typically through a second piston/cylinder assembly near the clutch handle or pedal as is well known in the art. The hydraulic line 145 is therefore connected to the piston/cylinder assembly 142/144 through the side cover 150 contrary to the second embodiment illustrated in FIG. 4 in which the hydraulic line 126 is connected to the piston/cylinder assembly 122/124 through the transmission input shaft 12.

In operation, to disengage the pressure plate 63 from the friction disks 50 and 52, the operator of the vehicle actuates the clutch handle or pedal which pushes hydraulic fluid through the hydraulic line 145 into the chamber 148 of the piston/cylinder assembly 142/144. The piston 142 is pushed outwardly by the hydraulic pressure as indicated by arrow C, which in turn pushes the release plate 62 that overcomes the force of the coil springs 64 thereby releasing the pressure exerted onto the friction disks 50 and 52 by the pressure plate 63 such that the friction disks 50 and 52 are spaced apart and the power transmission through the multiple-disk clutch 10 is interrupted.

As previously mentioned with reference to FIG. 4, because the piston/cylinder assembly 142/144 of the multiple-disk clutch 10 is supported by bearing 68, and therefore by inner clutch member 40 and by the transmission input shaft 12, the piston/cylinder assembly 142/144 is more rigid than prior art systems which are typically supported by the side cover of the transmission housing. The added stiffness of supporting the piston/cylinder assembly 142/144 on the internal components of the multiple-disk clutch 10 requires less travel to disengage the friction disks 50 and 52 as the bending of the side cover of the transmission is removed from the equation. Thus, the disengagement of the friction disks 50 and 52 requires less hydraulic fluid to displace the piston 142. In prior art systems, the hydraulic clutch actuation system is typically supported either by the side cover of the transmission or by the housing of the transmission, resulting in an elastic deformation that increases the length of travel of the piston required to disengage the friction disks. Mounting the piston/cylinder assembly 142/144 on the inner clutch member 40 eliminates the elastic deformation of prior art systems. The piston/cylinder assembly 122/124 could also be mounted on the outer clutch member 42 with similar results.

In each embodiment of the invention previously described, the actuating system (mechanical, hydraulic, or a combination of both) is supported by the inner clutch member 40 rendering the actuating system more rigid and requiring less travel to disengage the friction disks 50 and 52 than prior art systems.

Also, in each embodiment of the invention previously described, the actuating system (mechanical, hydraulic, or a combination of both) is positioned within the multiple-disk clutch 10 and more precisely, within a central cavity 51 formed by the plurality of alternating driven and driving friction disks 50 and 52, such that the moving parts of the actuating system are protected against the environment and the overall size of the multiple-disk clutch 10 is reduced.

Figure 6:
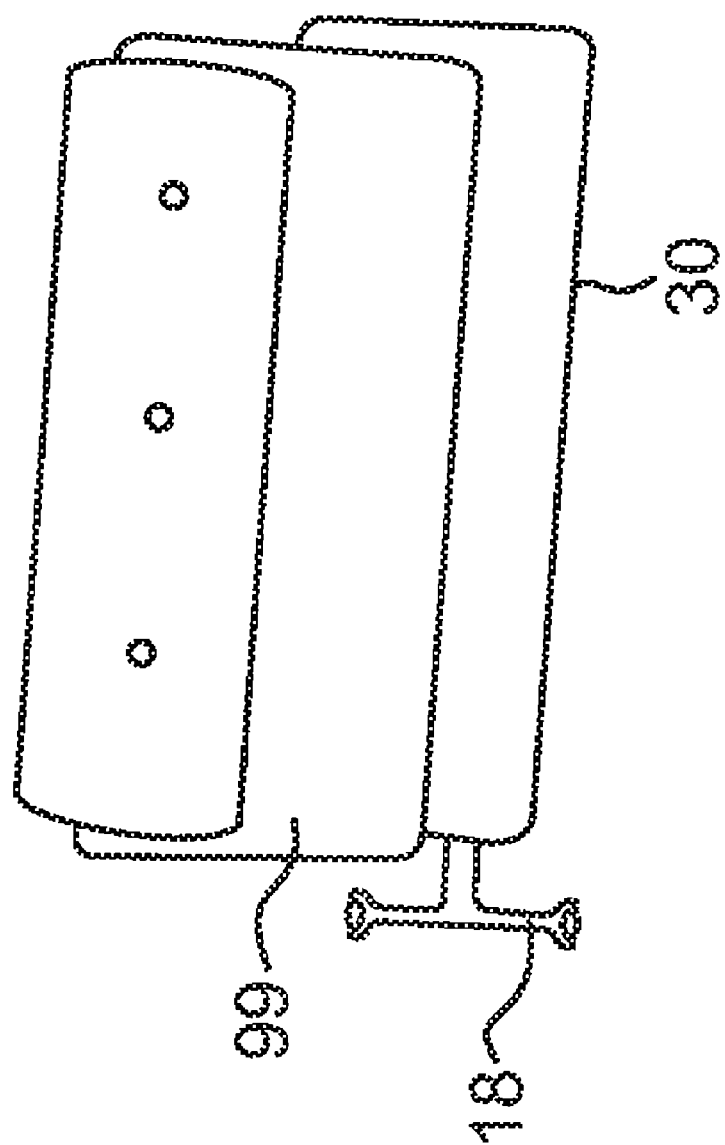
FIG. 6 is a top plan view of a schematic engine/transmission assembly including a clutch and clutch actuation system in accordance with any one of the embodiment of the invention.

With reference to FIG. 6, there is shown schematically an engine 99 mounted to a transmission casing 30 including any one of the embodiment of the multiple-disk clutch described herein.

Figure 7:
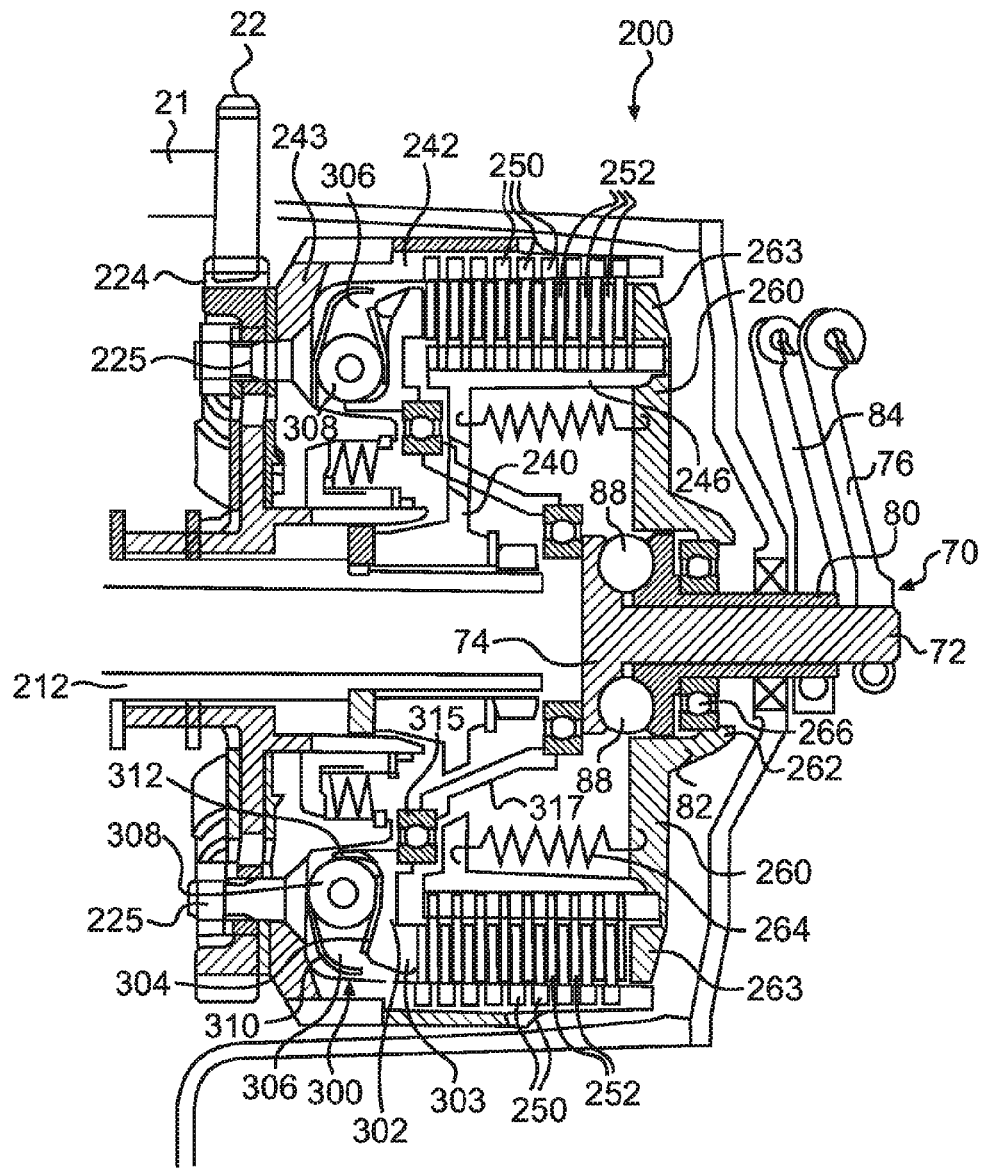
FIG. 7 is a cross-sectional view of a clutch and clutch actuation system in accordance with a fourth embodiment of the invention.

Referring now to FIG. 7, there is shown a fourth embodiment of the invention, wherein a multiple-disk clutch 200 is actuated by a mechanical actuation system 70 identical to the first embodiment illustrated in FIG. 1 combined with a centrifugal actuation system 300 positioned inside the multiple-disk clutch 200.

The actuation system 70 includes a central lever shaft 72 having an actuator plate 74 at one end thereof and a first lever 76 connected at the other end thereof, a peripheral lever shaft 80, hollowed and coaxial with the central lever shaft 72, the peripheral lever shaft 80 having an actuator plate 82 at one end thereof and a second lever 84 at the other end thereof, and a series of ball bearings 88 sandwiched between the actuator plates 74 and 82.

The multiple-disk clutch 200 includes an inner clutch member 240 disposed on the inner side of the multiple-disk clutch 200 and connected to the transmission input shaft 212, and an outer clutch member 242 disposed on the outer circumference of the multiple-disk clutch 200. The outer clutch member 242 is connected to the driven gear 224 via fasteners 225, the driven gear 224 being engaged to the drive gear 22 of the crankshaft 21 of an engine (not shown) to which the transmission 30 (FIG. 6) is mounted. An inner clutch element 246 extends from the inner clutch member 240. A series of driving friction disks 250 are connected to and extend inwardly from the outer clutch member 242. A series of driven friction disks 252 are connected to and extend outwardly from the inner clutch element 246. The driven friction disks 252 and the driving friction disks 250 are arranged axially alternately. The driving friction disks 250 are axially movable relative to the outer clutch member 242, and the driven friction disks 252 are axially movable relative to the inner clutch element 246. A pressure member 260 is mounted via coil springs 264 to the inner clutch member 240. The pressure member 260 is in the form of a pressure plate 263 that circumscribes the alternately arranged driving and driven friction disks 250 and 252. The pressure plate 263 applies pressure to the alternately arranged driving and driven friction disks 250 and 252 to engage the outer clutch member 242 with the inner clutch member 240 and transmit power from the crankshaft 21 to the transmission input shaft 212. The pressure member 260 includes a release portion 262 abutting against bearing 266 which is mounted onto the actuator plate 82 of the actuation system 70. When the pressure applied to the driving and the driven friction disks 250 and 252 by the pressure plate 263 is released, the driving and the driven friction disks 250 and 252 are spaced apart and power transmission is interrupted. The actuation system 70 is supported by bearing 68 which is supported by a cylindrical housing 317 itself resting on a second bearing 315.

The centrifugal actuation system 300 is positioned on the opposite side of the driving and the driven friction disks 250 and 252 relative to the actuation system 70 and is mounted to the inner portion 243 of the outer clutch member 242 via fasteners 225. The centrifugal actuation system 300 includes a second pressure plate 302 having a shoe portion 303 that circumscribes the alternately arranged driving and driven friction disks 250 and 252 and is designed to apply pressure to the driving and driven friction disks 250 and 252 to engage the outer clutch member 242 with the inner clutch member 240 from the opposite side of the driving and the driven friction disks 250 and 252 relative to the actuation system 70. The centrifugal actuation system 300 also includes a series of cavities 306, each housing a weighted ball bearing 308 which can also be a weighted cylindrical bearing. The cavities 306 are defined by a first ramping surface 310 located on the inner portion 243 of the outer clutch member 242, a second ramping surface 304 on one side of the second pressure plate 302 opposite the friction disks 250 and 252, and by an inner elbow extension 312 of the second pressure plate 302. The second pressure plate 302 is resting on a bearing 315 itself mounted onto a cylindrical housing 317 located in the central portion of the multiple-disk clutch 200.

The actuation system 70 is supported by bearing 68 which is supported by the cylindrical housing 317 itself resting on the second bearing 315 which is supported by the second pressure plate 302 of the centrifugal actuation system 300. The actuation system 70 is therefore supported by the outer clutch member 242. Because the actuation system 70 of the multiple-disk clutch 200 is supported by bearing 68, and therefore by the outer clutch member 242 and by the driven gear 224, the actuation system 70 is stiffer than prior art systems which are typically supported by the side cover of the clutch. The added stiffness of supporting the actuation system 70 on the internal components of the multiple-disk clutch 200 enables the design of an actuation system 70 that requires less travel to disengage the friction disks 250 and 252 as the bending of the side cover of the clutch is removed from the equation. Thus, for a given length of the first and second levers 76 and 84 (FIG. 3), the disengagement of the friction disks 250 and 252 requires less force to be applied by the driver when the driver actuates the clutch handle or pedal. This is particularly advantageous for clutch handle since the available force of a human hand is limited. In prior art systems, the clutch actuation system is supported either by the side cover of the transmission or by the housing of the transmission resulting in an elastic deformation that increases the length of travel requires to disengage the friction disks. Mounting the actuation system 70 on the outer clutch member 242 eliminates the elastic deformation of prior art systems. The actuation system 70 could also be mounted on the inner clutch member 240 with similar results.

In operation, as the engine rpm increases, the weighted ball bearing 308 of each cavity 306 is forced to move outwardly as illustrated by arrow "F", up the ramping areas 304 and 310, thereby pushing to the second pressure plate 302 against the driving and driven friction disks 250 and 252, such that the shoe portion 303 applies pressure onto the driving and driven friction disks 250 and 252 to engage the outer clutch member 242 with the inner clutch member 240 and transmit power from the crankshaft 21 to the transmission input shaft 212. The centrifugal actuation system 300 engages the outer clutch member 242 with the inner clutch member 240 by applying pressure to the driving and driven friction disks 250 and 252 on the opposite side relative to the actuation system 70.

As previously described with reference to FIGS. 1 to 3, when the operator of the vehicle actuates the actuation system 70, the first lever 76 and the second lever 84 are pulled towards each other, thereby rotating the actuator plates 74 and 82 in opposite direction, forcing the ball bearings 88 up the ramping areas 92 onto flat surfaces 94 and in so doing, pushing the actuator plates 74 and 82 apart as illustrated by arrows C in FIG. 2c, thereby increasing the distance between actuator plates 74 and 82 and disengaging the inner and outer clutch member 240 and 242 such that the friction disks 250 and 252 are spaced apart and power transmission through the multiple-disk clutch 200 is interrupted.

The manual actuation system 70 and the centrifugal actuation system 300 remain independent from each other. Because the actuation system 70 is effectively supported by the second pressure plate 302 of the centrifugal actuation system 300, the distance required between actuator plates 74 and 82 to disengage the inner and outer clutch member 240 and 242 is independent of the position of the weighted ball bearing 308 within the cavities 306. The inner and outer clutch member 240 and 242 can be disengaged by the same movement of the first and second lever 76 and 84 of the manual actuation system 70, irrespective of the centrifugal actuation system 300.

Combining the actuation system 70 with the centrifugal actuation system 300 enables the driver of the vehicle on which it is mounted to increase the rpm of the engine with the outer clutch member 242 and the inner clutch member 240 partially engaged by the centrifugal actuation system 300 while applying the brakes prior to engaging the inner and outer clutch member 240, 242 by releasing the clutch handle or pedal connected the manual actuation system 70, thus allowing for an aggressive take-off. Furthermore, in an emergency braking situation, the manual actuation system 70 is able to disengage the inner and outer clutch member 240 and 242 whereas with a centrifugal actuation system alone, the clutch could not be disengaged until the engine rpm went down to the threshold of engagement.

Figure 8:
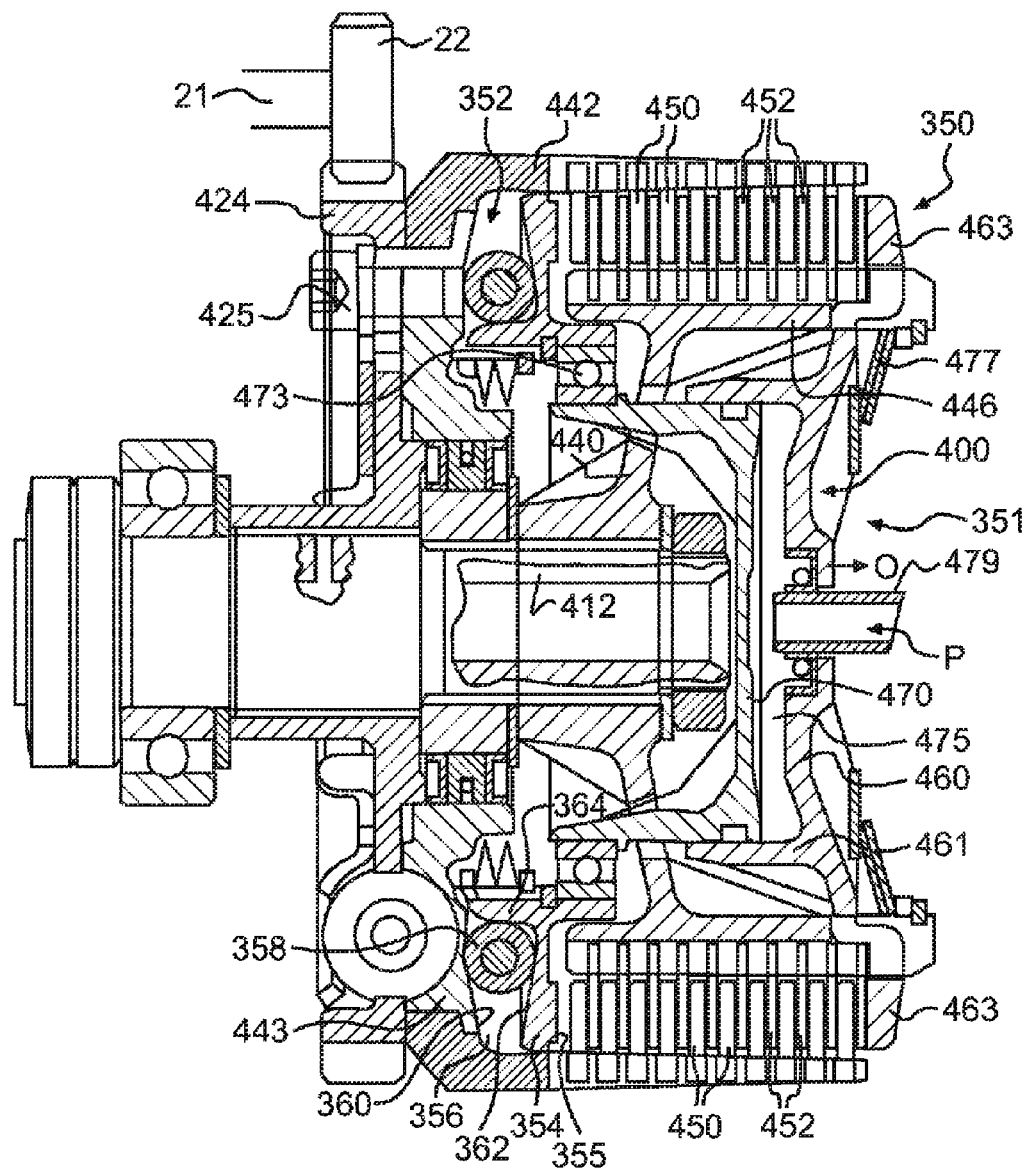
FIG. 8 is a cross-sectional view of a clutch and clutch actuation system in accordance with a fifth embodiment of the invention.

With reference to FIG. 8, there is shown a fifth embodiment of the invention in which a multiple-disk clutch 350 includes a centrifugal actuation system 352 similar to the one shown and described with reference to FIG. 7, combined with an hydraulic actuation system 400 positioned within the multiple-disk clutch 350, and more precisely, within a central cavity 351 formed by the plurality of alternating driven and driving friction disks 450 and 452.

The multiple-disk clutch 350 includes an inner clutch member 440 disposed on the inner side of the multiple-disk clutch 350 and connected to the transmission input shaft 412, and an outer clutch member 442 disposed on the outer circumference of the multiple-disk clutch 350. The outer clutch member 442 is connected to the driven gear 424 via fastener 425. The driven gear 424 is engaged to the drive gear 22 of the crankshaft 21 of an engine (not shown) to which the transmission 30 (FIG. 6) is mounted. An inner clutch element 446 extends from the inner clutch member 440. A series of driving friction disks 450 are connected to and extend inwardly from the outer clutch member 442. A series of driven friction disks 452 are connected to and extend outwardly from the inner clutch element 446. The driven friction disks 452 and the driving friction disks 450 are arranged axially alternately. The driving friction disks 450 are axially movable relative to the outer clutch member 442, and the driven friction disks 452 are axially movable relative to the inner clutch element 446.

The hydraulic actuation system 400 includes a pressure member 460 which also defines the cylinder portion of the hydraulic actuation system 400. The pressure member 460 extends radially into the pressure plate 463 that circumscribes the alternately arranged driving and driven friction disks 450 and 452. The pressure plate 463 includes a cylinder portion 461 extending inwardly therefrom. The hydraulic actuation system 400 also includes a piston portion 470 inserted within the cylinder portion 461 at one end and mounted to a bearing 473 at the other end. The cylinder portion 461 and the piston portion 470 together define a hydraulic chamber 475. An hydraulic fluid conduit 479 connects the chamber 475 to a clutch handle or pedal (not shown) of the vehicle typically through a second piston/cylinder assembly near the clutch handle or pedal as is well known in the art. A spring washer 477 abutting against the pressure member 460 maintains the pressure plate 463 in contact with the driving and driven friction disks 450 and 452 and maintains pressure onto the driving and driven friction disks 450 and 452 such that the inner and outer clutch members 440 and 442 remain engaged to transmit motive power from the crankshaft 21 of the engine (not shown) to the transmission input shaft 412.

In operation, the spring disk 477 abutting against the pressure member 460 maintains pressure onto the driving and driven friction disks 450 and 452. When the driver of the vehicle actuates the clutch handle or pedal of the vehicle, hydraulic fluid under pressure is introduced into the chamber 475, as indicated by arrow 'P'. The hydraulic fluid under pressure expands the volume of the chamber 475 with the effect of pushing the pressure member 460 outwardly as indicated by arrow 'O', and overcoming the force of the spring washer 477, thereby releasing the pressure exerted on the driving and driven friction disks 450 and 452 by the pressure plate 463, and disengaging the multiple-disk clutch 350, such that the friction disks 450 and 452 are spaced apart and power transmission through the multiple-disk clutch 350 is interrupted.

The centrifugal actuation system 352 is positioned on the opposite side of the driving and driven friction disks 450 and 452 relative to the pressure plate 463. The centrifugal actuation system 352 is supported by the outer clutch member 442. The centrifugal actuation system 352 includes a second pressure plate 354 having a shoe portion 355 that circumscribes the alternately arranged driving and driven friction disks 450 and 452 and is designed to apply pressure to the driving and driven friction disks 450 and 452 to engage the outer clutch member 442 with the inner clutch member 440 from the opposite side of the driving and the driven friction disks 450 and 452 relative to the pressure plate 463. The centrifugal actuation system 352 also includes a series of cavities 356, each housing a weighted ball bearing 358 which can also be a weighted cylindrical bearing. The cavities 356 are defined by a first ramping surface 360 located on the inner portion 443 of the outer clutch member 442, a second ramping surface 362 on one side of the second pressure plate 354 opposite the friction disks 450 and 452, and by an inner elbow extension 364 of the second pressure plate 354. The second pressure plate 354 is resting on a bearing 473 which also supports the piston portion 470 of the hydraulic actuation system 400.

The hydraulic actuation system 400 is therefore supported by the centrifugal actuation system 352 via bearing 473 and the second pressure plate 354. As the centrifugal actuation system 352 is supported by the outer clutch member 442, the hydraulic actuation system 400 is effectively supported by the outer clutch member 442. Because the hydraulic actuation system 400 of the multiple-disk clutch 350 is supported by bearing 473, and therefore by the outer clutch member 442 and by the driven gear 424 via the centrifugal actuation system 352, the hydraulic actuation system 400 is more rigid than prior art systems which are typically supported by the side cover of the transmission housing. The added rigidity of supporting the hydraulic actuation system 400 on the internal components of the multiple-disk clutch 350 requires less travel to disengage the friction disks 450 and 452 as the bending of the side cover of the transmission is removed from the equation. Thus, the disengagement of the friction disks 450 and 452 requires less hydraulic fluid to displace the pressure member 460. In prior art systems, the hydraulic clutch actuation system is typically supported either by the side cover of the transmission or by the housing of the transmission resulting in an elastic deformation that increases the length of travel of the piston required to disengage the friction disks. Mounting the hydraulic actuation system 400 on the outer clutch member 442 eliminates the elastic deformation of prior art systems. The hydraulic actuation system 400 could also be mounted on the inner clutch member 440 with similar results.

In operation, as the engine rpm increases, the weighted ball bearing 358 of each cavity 356 is forced to move outwardly as illustrated by arrow "F", up the ramping areas 360 and 362, thereby pushing to the second pressure plate 354 against the driving and driven friction disks 450 and 452, such that the shoe portion 355 applies pressure onto the driving and driven friction disks 450 and 452 to engage the outer clutch member 442 with the inner clutch member 440 and transmit power from the crankshaft 21 to the transmission input shaft 412. The centrifugal actuation system 352 engages the outer clutch member 442 with the inner clutch member 440 by applying pressure to the driving and driven friction disks 450 and 452 on the opposite side relative to the pressure plate 463.

The hydraulic actuation system 400 and the centrifugal actuation system 352 remain independent from each other. Because the hydraulic actuation system 400 is supported by the second pressure plate 354 of the centrifugal actuation system 352 via the bearing 473, the volume of hydraulic fluid required to move the pressure member 460 to disengage the inner and outer clutch member 440 and 442 is independent of the position of the weighted ball bearing 358 within the cavities 356. The inner and outer clutch member 440 and 442 can be disengaged by the same movement of the clutch handle connected to the hydraulic actuation system 400, irrespective of the centrifugal actuation system 352.

As previously mentioned with reference to FIG. 7, combining the hydraulic actuation system 400 with the centrifugal actuation system 352 enables the driver of the vehicle on which it is mounted to increase the rpm of the engine with the outer clutch member 442 and the inner clutch member 440 partially engaged by the centrifugal actuation system 352 while applying the brakes prior to engaging the inner and outer clutch members 440, 442 by releasing the clutch handle or pedal connected to the hydraulic actuation system 400, thus allowing for an aggressive take-off. Furthermore, in an emergency braking situation, the hydraulic actuation system 400 is able to disengage the inner and outer clutch members 440 and 442, whereas with a centrifugal actuation system alone, the clutch could not be disengaged until the engine rpm went down to the threshold of engagement.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A multiple-disk clutch for transmitting power from a crankshaft of an engine to a transmission input shaft, the multiple-disk clutch comprising:
    an inner clutch member adapted to be connected to the transmission input shaft;
    an outer clutch member disposed around at least a portion of the inner clutch member and adapted to be connected to the crankshaft;
    a plurality of driving friction disks connected to and extending from the outer clutch member toward the inner clutch member;
    a plurality of driven friction disks connected to and extending from the inner clutch member toward the outer clutch member, the driven friction disks and the driving friction disks being arranged alternately;

a first pressure member being axially movable to compress the driving and the driven friction disks together and to disengage the driven friction disks from the driving friction disks, the first pressure member being biased to urge the driving and driven friction disks together in a compression direction;

a first actuation system having a first portion connected to the first pressure member, the first actuation system being adapted to overcome the biasing force urging the driving and driven friction disks together in the compression direction and release the compression force exerted by the first pressure member on the driving and the driven friction disks such that the friction disks are spaced apart and power transmission through the multiple-disk clutch is interrupted; and a second actuation system including a second pressure member, the second pressure member being axially movable to compress the driving and the driven friction disks together, the driving and driven friction disks being disposed between the first and second pressure members, the second actuation system being a centrifugal actuation system being adapted to apply pressure to the driving and driven friction disks as a function of a speed of rotation of the multiple-disk clutch, a second portion of the first actuation system being connected to the second pressure member such that the second portion of the first actuation system is axially movable with the second pressure member.

2. A multiple-disk clutch as defined in claim 1, wherein:
the first actuation system includes at least two ball bearings sandwiched between a first actuator plate and a second actuator plate;
each actuator plate includes cavities for receiving the at least two ball bearings;
each cavity includes a ramping area; and
the actuator plates are adapted to rotate in opposite direction such that the ball bearings are forced up the ramping areas thereby pushing the actuator plates apart and forcing the pressure member to release the compression force on the driving and the driven friction disks.

3. A multiple-disk clutch as defined in claim 2, further comprising:
a first lever shaft connected at one end thereof to the first actuator plate, the first lever shaft having a first lever connected at the other end thereof; and
a second lever shaft connected at one end thereof to the second actuator plate, the second lever shaft having a second lever connected at the other end thereof;
wherein movement of at least one of the first and second levers causing rotation of the first and second actuator plates.

4. A multiple-disk clutch as defined in claim 3, wherein the first and second levers are connected together via a cable linked to one of a clutch handle and pedal for interaction with an operator.

5. A multiple-disk clutch as defined in claim 1, wherein the first actuation system includes:
a hydraulic piston/cylinder assembly including the first and second portions, the first portion being a cylinder portion connected to the first pressure member, the second portion being a piston portion connected to the second pressure member; and
a hydraulic line connected to and in fluid communication with the piston/cylinder assembly;
wherein, in operation, hydraulic fluid under pressure expands the piston/cylinder assembly which in turn pushes the first pressure member to release the compression force exerted by the first pressure member on the driving and the driven friction disks.

6. A multiple-disk clutch as defined in claim 5, wherein the hydraulic line extends through the first pressure member.

7. A multiple-disk clutch as defined in claim 1, further comprising at least one spring biasing the first pressure member to urge the driving and driven friction disks together in the compression direction.

8. A multiple-disk clutch as defined in claim 7, wherein the at least one spring is disposed between the first pressure member and the inner clutch member.

9. A multiple-disk clutch as defined in claim 1, wherein a distance by which the first pressure member has to be moved axially by the first actuation system to disengage the driven friction disks from the driving friction disks is the same regardless of a position of the second pressure member.

10. A multiple-disk clutch as defined in claim 5, wherein a volume of hydraulic required to push the first pressure member to release the compression force exerted by the first pressure member on the driving and the driven friction disks is independent of a position of the second pressure member.

11. A multiple-disk clutch as defined in claim 1, wherein the first portion is a cylinder portion connected to the first pressure member and the second portion is a piston portion connected to the second pressure member.

\* \* \* \* \*